United States Patent
McKinsey et al.

(10) Patent No.: US 6,446,258 B1
(45) Date of Patent: Sep. 3, 2002

(54) INTERACTIVE INSTRUCTION SCHEDULING AND BLOCK ORDERING

(75) Inventors: Christopher M. McKinsey, Cupertino; Jayashankar Bharadwaj, Saratoga, both of CA (US)

(73) Assignee: Intle Corporation, Santa Clara, CA (US)

(*) Notice: Subject to any disclaimer, the term of this patent is extended or adjusted under 35 U.S.C. 154(b) by 0 days.

(21) Appl. No.: 09/185,422

(22) Filed: Nov. 3, 1998

(51) Int. Cl.[7] ................................................. G06F 9/45
(52) U.S. Cl. .................... 717/161; 717/154; 717/156
(58) Field of Search ................................ 717/5, 9, 161, 717/160, 140, 151, 154, 156; 712/204, 205

(56) References Cited

U.S. PATENT DOCUMENTS

| | | | | |
|---|---|---|---|---|
| 4,656,583 A | * | 4/1987 | Auslander et al. | 717/153 |
| 5,175,856 A | * | 12/1992 | Van Dyke et al. | 717/155 |
| 5,557,761 A | * | 9/1996 | Chan et al. | 717/156 |
| 5,787,287 A | * | 7/1998 | Bharadwaj | 717/144 |
| 5,790,867 A | * | 8/1998 | Schmidt et al. | 717/151 |
| 5,828,886 A | * | 10/1998 | Hayashi | 717/154 |
| 5,887,174 A | * | 3/1999 | Simons et al. | 712/216 |
| 5,894,576 A | * | 4/1999 | Bharadwaj | 717/156 |
| 5,978,588 A | * | 11/1999 | Wallace | 717/156 |
| 5,999,738 A | * | 12/1999 | Schlansker et al. | 712/233 |
| 6,044,222 A | * | 3/2000 | Simons et al. | 712/233 |
| 6,059,840 A | * | 5/2000 | Click, Jr. | 717/154 |
| 6,072,951 A | * | 6/2000 | Donovon et al. | 717/9 |
| 6,077,314 A | * | 6/2000 | Ng | 717/154 |
| 6,117,185 A | * | 9/2000 | Schmidt | 717/9 |
| 6,128,775 A | * | 10/2000 | Chow et al. | 717/156 |
| 6,151,706 A | * | 11/2000 | Lo et al. | 717/155 |
| 6,170,083 B1 | * | 1/2001 | Adl-Tabatabai | 717/158 |
| 6,243,864 B1 | * | 6/2001 | Odani et al. | 717/154 |
| 6,260,190 B1 | * | 7/2001 | Ju | 717/156 |

OTHER PUBLICATIONS

Morgan, R.; Building an Optimizing Compiler. Digital Press, Wodburn, MA, Dec. 1997, sections 2.7–2.9 and 14.4.*

Morgan, B.; Building an Optimizing Compiler, Digtal Press, Dec. 01, 1997, chapter 14.*

Agrawal, G.; "Interprocedural Partial Redundancy Elimination With Application to Distributed Memory Compilation". IEEE/IEE[online], IEEE Transactions on Parallel and Distributed Systems, p. 609(16), Jul. 1998.*

Aho et al.; Compilers: Principles, Techniques, and Tools. Reading MA, Addison–Wesley Publishing Co., Chapter 10, Dec. 1985.*

Muchnick, S.; Advanced Compiler Design and Implementation. San Francisco, CA, Morgan Kaufmann Publishers, Chapter 17, Aug. 1997.*

Morgan, B.; Building and Optimizing Compiler. New York, NY, Digital Press, Chapters 2 and 8, Dec. 1997.*

Nakatani et al.; "Using a Lookahead Window in a Compaction–Based Parallelizing Compiler". IEEE/IEE[online], Proceedings of the 23rd Annual Workshop and Symposium on Microprogramming and Microarchitecture, p. 57(11), Nov. 1990.*

* cited by examiner

Primary Examiner—Thomas Black
Assistant Examiner—Kelvin Booker
(74) Attorney, Agent, or Firm—Alan K. Aldous

(57) ABSTRACT

In some embodiments, the invention includes a method of compiling instructions of a program. The method includes receiving instructions for code motion and controlling the code motion while interacting with block ordering. The code motion may be done as part of various activities including instruction scheduling, partial redundancy elimination, and loop invariant removal. The scheduling may involve making an assessment of the cost of scheduling an instruction that takes into account generation and/or elimination of branches due to resulting block order update and determining whether to make the code motion based on the cost. Instruction scheduling may involve regeneration of predicate expressions to invert conditional branches.

23 Claims, 6 Drawing Sheets

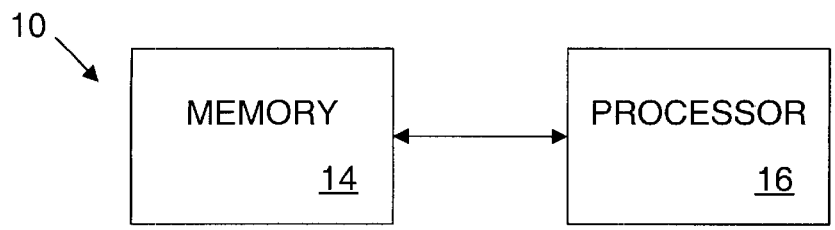
FIG. 1
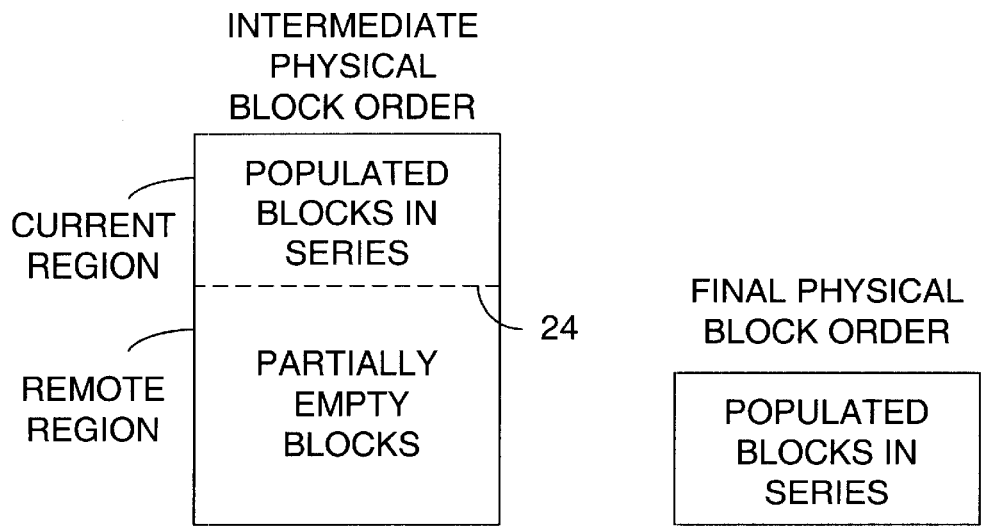
FIG. 2A
FIG. 2B
FIG. 3

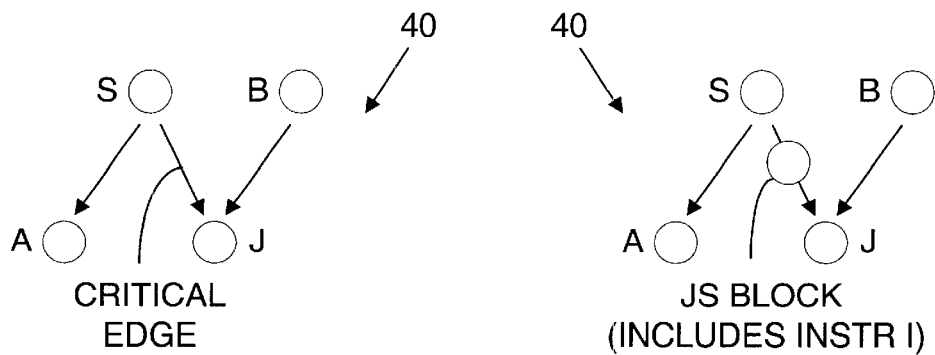
FIG. 4A
FIG. 4B
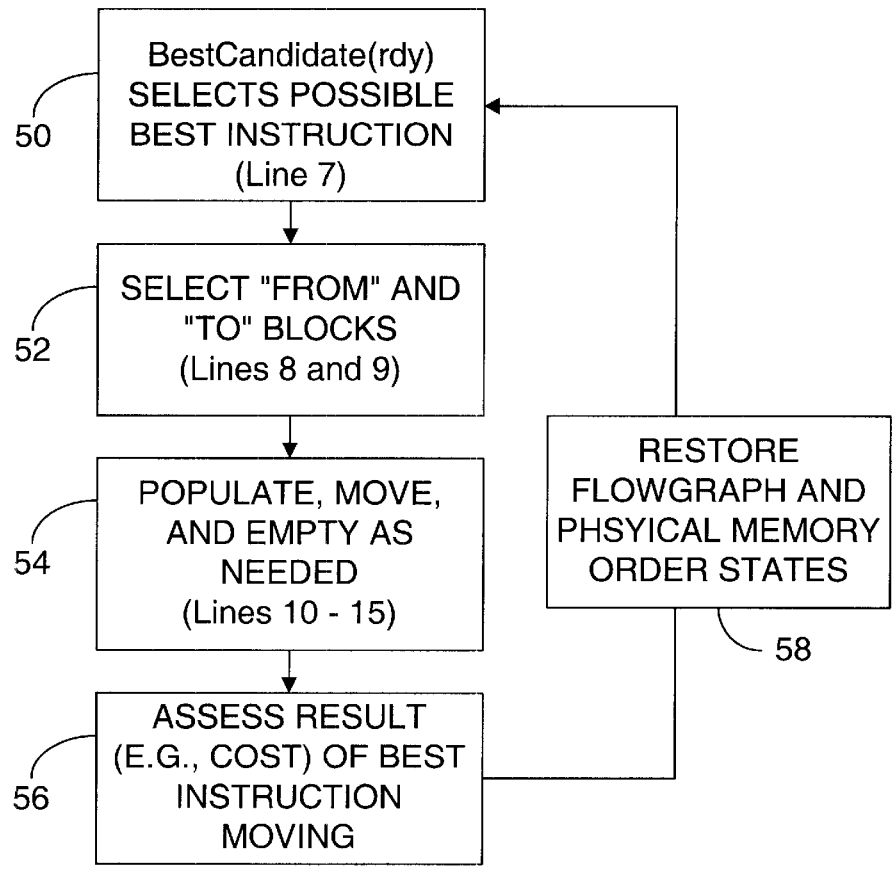
FIG. 5

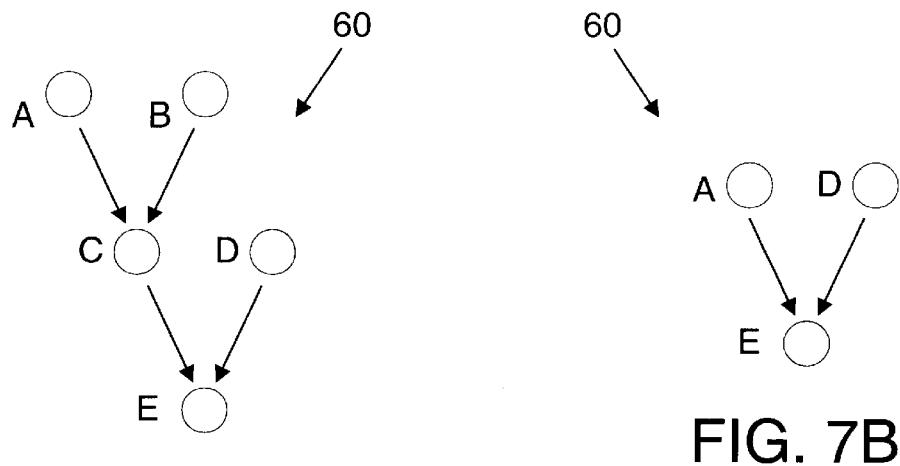
FIG. 7A
FIG. 7B
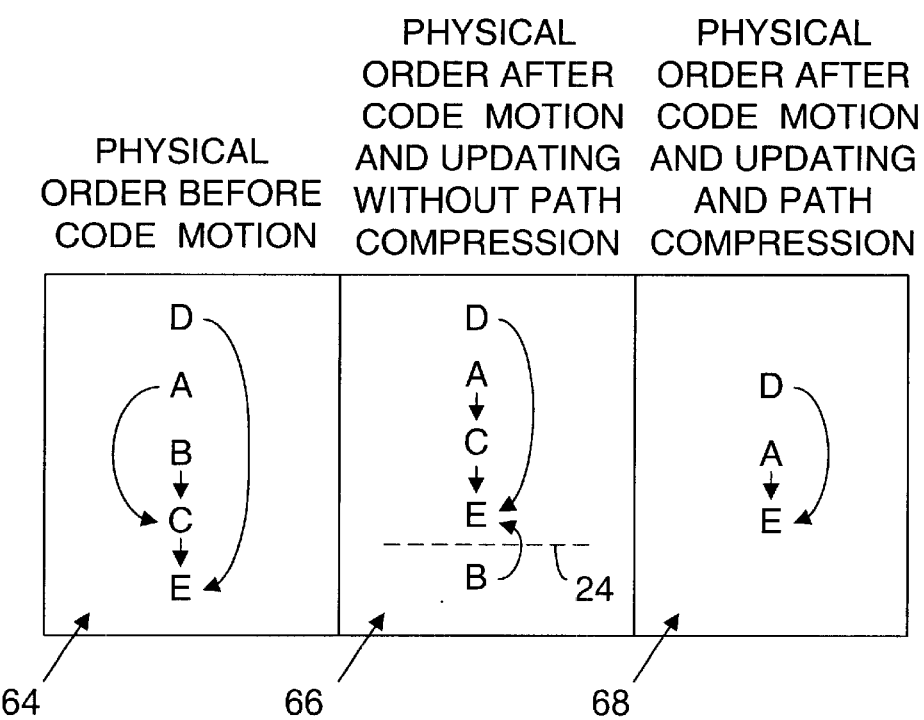
FIG. 7C

INTERACTIVE INSTRUCTION SCHEDULING AND BLOCK ORDERING

BACKGROUND OF THE INVENTION

1. Technical Field of the Invention

The present invention relates to compilers.

2. Background Art

A compiler is a program that reads a source program written in a source language and translates it into a target program in a target language. For example, a compiler may translate a high level source program (such as C++) into compiled code that can be understood by a processor, such as a microprocessor.

Block ordering (also called code placement) concerns the order in which instructions and blocks of instructions are to appear in physical memory. The block ordering may involve the selection of certain branch instructions between some of the blocks. It is generally true that it takes fewer cycles or other processor resources if the instruction is able to fall through to the next contiguous instruction in memory rather than branching to another instruction. Accordingly, block ordering involves attempting to pick the direction of a conditional branch such that it falls through to an instruction that is more likely to occur and branches to an instruction less likely to occur. Another benefit of doing so is that spatial locality is more likely to exist in a cache. Instruction scheduling involves moving instructions (called code motion) to better assign instructions to an execution unit for a particular cycle. The scheduler may move code within a block (called local code motion) or between blocks (called global code motion). Some schedulers are capable of only local code motion, while other schedulers are capable of local and global code motion.

In prior art compilers, block ordering and instruction scheduling are independent activities. For example, in the compiling process of some prior art compilers, first an instruction order and accordingly a block order is chosen. Next, instruction scheduling is performed. Instruction scheduling involves code motion or moving instructions to different locations in physical memory to attempt better utilization of execution units. If there are three execution units, an attempt is made to have each execution unit be busy during each cycle. Following the completion of scheduling, the physical order is re-evaluated to see if can be improved. For example, if an unconditional branch branches to the next sequential instruction in memory, the unconditional branch can be removed without changing the operation of the program. However, in making these changes to the physical order, the execution units may be less well utilized. Good block ordering increases performance. Good instruction scheduling also increases performance. In the prior art compilers, however, by treating instruction scheduling and ordering as sequential, independent activities, both the instruction ordering and scheduling suffer. Accordingly, performance suffers.

Accordingly, there is a need for a compiler with improved instruction scheduling and ordering.

SUMMARY

In some embodiments, the invention includes a method of compiling instructions of a program. The method includes receiving instructions for code motion and controlling the code motion while interacting with block ordering.

The code motion may be done as part of instruction scheduling. The scheduling may involve making an assessment of the cost of scheduling an instruction and determining whether to make the code motion based on the cost.

The scheduling may involve regeneration of predicate expressions to invert conditional branches.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 1 is a schematic block diagram representation of a processor and memory used in compiling.

FIG. 2A is a representation of an intermediate physical block order.

FIG. 2B is a representation of a final physical block order.

FIG. 3 is a representation of a table.

FIG. 4A is a control flowgraph.

FIG. 4B is a control flowgraph.

FIG. 5 is a flowchart illustrating a feedback feature that may be used by the compilation code.

FIG. 7A is a control flowgraph.

FIG. 7B is a control flowgraph.

FIG. 7C is a representation of physical block order at different times.

DETAILED DESCRIPTION

A. Overview

Figure 6A:
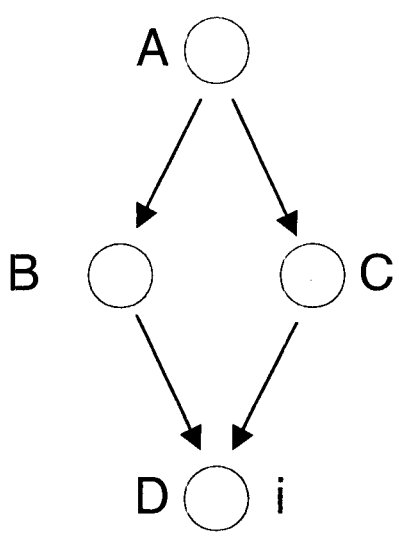
FIG. 6A is a control flowgraph.

Referring to FIG. 1, a computer system 10 includes memory 14 and a processor 16, which executes a compiler program (called the "compiler") to compile a source program in memory 14 to create a compiled program. Memory 14 holds the source program to be compiled, intermediate forms of the source program, and the resulting compiled program. Memory 14 may also hold the compiler. Memory 14 is intended as a generalized representation of memory and may include a variety of forms of memory, such as a hard drive, CD-ROM, and random access memory (RAM) and related circuitry. A hard drive, CD-ROM, and RAM are examples of articles including machine readable media. For example, the compiler may be included on a CD-ROM and loaded from the CD-ROM to a hard drive.

The phrase "some embodiments" refers to at least some embodiments of the invention. The various appearances "some embodiments" are not necessarily all referring to the same embodiments.

During any phase of compilation where instructions are moved around the program, the basic blocks (called blocks) may change. That is, new blocks on edges in the flow graph may be created and other blocks on edges may be emptied in response to code motion. In some embodiments, the invention involves dynamically updating physical instruction block placement during an instruction scheduling phase of compilation or during another phase of compiling involving code motion (e.g., partial redundancy elimination (PRE) or loop invariant removal). Branch instructions may be eliminated or changed as part of the updating. The instruction scheduling and block order updating is interactive, because the block ordering update follows the scheduling of some instructions, but scheduling of other instructions is done with knowledge of the updating of block order and related branch instructions. The scheduler can keep the execution units busier and with better code.

In some embodiments, the invention includes a candidate selection mechanism that can measure the cost of populating an otherwise empty block or emptying a block. For example, when a block is populated, an additional unconditional branch instruction may be added that otherwise would not be included. Further, that unconditional branch may cost more overall runtime cycles than the savings gained by populating the block. The unconditional branch may or may not be in the same block that is populated so the branch may be added in a block which is executed more than the block populated. This also means that scheduling heuristics can be driven to empty blocks for the sole goal of eliminating branches and their pipeline bubbles. The cost may be a global or regional cost in terms of an estimate of change in performance in executing the compiled program once it is compiled.

The invention differs from prior art compilers in which the physical block order is fixed during the course of scheduling the code. Opportunities for code improvement are thereby missed. In some of these prior art compilers, block ordering is performed again after scheduling all the code, and the code may then be rescheduled. However, several iterations of block ordering and rescheduling may be needed to realized the benefit the present invention provides, if it could be achieved at all by the prior art compilers. Further, it would take a significant amount of time to perform multiple iterations of scheduling, block ordering, and rescheduling, which in many instances would not be practical. By contrast, in embodiments of the present invention, the compiler considers whether to change the physical order after merely one or a small number of instructions has been scheduled or otherwise considered for movement, even though many more instructions are yet to be scheduled or otherwise considered for movement. As described below, in so doing, various opportunities to improve performance can be identified that are missed by the prior art compilers.

As instructions are moved globally around the control flowgraph, basic blocks become populated or emptied. This opens opportunity for improving the code placement over what is was before the scheduler started. A side effect of rearranging the code placement is the modification of branches. For example, unconditional branches may need to be added or removed from the graph and conditional branches may need to be inverted. In a microprocessor where branches compete for resources with other instructions to be scheduled, dynamic code placement (updating) exposes those branches to the scheduler so that it has an exact view of the instructions competing for resources.

Before providing examples, the following background information is provided. A conditional branch instruction has a target instruction and a fall through instruction. The fall through instruction is the next instruction in memory. It is generally true that fewer cycles or other processor resources are used when the instruction following the condition branch instruction in time order is the fall through instruction rather than the target instruction. Accordingly, the compiler may attempt to determine which instruction is more likely to follow the conditional branch in time order and to make that instruction the fall through instruction. When all of the instructions are removed from a block it is said to be empty.

A control flowgraph is a well known representation of code that includes blocks and edges. The blocks (also called nodes, basic blocks, or vertices) represent instructions (also called code). An edge represents the transfer of control from one block to another. Control is transferred either by the execution of a branch instruction, or by falling sequentially into the code in the physically contiguous next block.

Physical block order (sometimes called code layout, memory order, or physical memory order) is the order that the blocks (and hence the instructions of the block) are assigned for the instruction memory. Referring to FIGS. 2A, in some embodiments, during intermediate stages of the compilation process, the instruction memory includes a current region and a remote region. An imaginary line 24 separates the current and remote regions. Table 1 provides definitions.

TABLE 1

| | |
|---|---|
| Populated Block | Block in current region of instruction memory having at least one instruction which is not an unconditional branch |
| Partially Empty Block | Block in remote region of instruction memory having only one instruction, which is an unconditional branch instruction |
| Fully Empty Block | Block having no instructions; it is not in either the current or remote region of instruction memory |

Partially empty blocks are created by inserting an unconditional branch in a block that has been made empty through code motion. Fully empty blocks have no instructions and are in neither the current region nor remote region of the instruction memory. When a populated block is emptied by code motion, the block is made a partially empty block if it effects the control flow between other blocks, (e.g., if it is between two blocks connected by a branch). If the emptied block does not effect the control flow between other blocks (e.g., it separates two blocks that would be separated in a fall through condition), it is a fully emptied block.

Referring to FIG. 2B, at the end of compilation, a final physical block order includes only populated block. A path compression technique described below may be used to remove partially empty blocks. There are no blocks in a remote region, so current and remote regions are not shown in FIG. 2B. In some embodiments, there are no partially empty blocks placed in a remote region of memory.

Referring to FIG. 3, a block order table 30 contains information regarding the order of blocks within the physical block order. In some embodiments, table 30 contains information regarding populated blocks, partially empty blocks, and fully empty blocks. As the order changes, table 30 can be updated. A function which accesses table 30 is called LookupOrder( ). One reason to keep track of the order for all blocks is that if an empty block is removed, and it is later decided to return the block to the control flowgraph, it will be known where to return it. Also, blocks (some of which may be JS blocks, described below) may be empty before code motion is started for a particular scheduling phase. The block may then get populated and need to be reintroduced into the current region of the physical order. Further, in some embodiments, it is desirable that all blocks that may be used during scheduling be allocated before scheduling begins. Table 30 may then hold information regarding all these possibly populated blocks. In this way, if the control flowgraph does not include a particular block, that block is still accounted for. In other embodiments, table 30 might not hold information regarding all possible blocks.

In some embodiments, the control flowgraph only holds populated blocks and partially empty blocks. In other embodiments, the control flowgraph may only include populated blocks. In still other embodiments, the control flowgraph may include all blocks (populated, partially empty, and fully empty), although on different levels. On one level, the control flowgraph could include only populated blocks (or only populated and partially empty blocks). On another level, the control flowgraph would include the position of all types of blocks. Table 30 may contain this information. Table 30 may be organized in various ways.

Various methods may be used to updating physical block order and associated branches following code motion. The follow section discusses some of these methods. It will be apparent to those skilled in the art having the benefit of this disclosure that other methods may be used within the scope of the invention.

B. Pseudocode and Explanation

The following pseudocode provides an exemplary high level view of certain aspects of compiling. Statements of the pseudocode are numbered for convenience of discussion. Different embodiments of the invention involve different statements of the pseudocode. Other embodiments of the invention include aspects of some or all of the statements (as explained below). The statements do not have to be in the order provided in the pseudocode and certain statements of the pseudocode could be combined.

1 Construct an initial block ordering;
2 NormalizeCriticalEdges(CFG);
3 RemoveEmptyBlocksAndUpdateBranches(CFG);
4 ConstructBlockOrderingTable(CFG);
5 rdy←DagRoots(DDG);
6 while (rdy≠∅) do
7 best←BestCandidate(rdy);
8 from←Block(best);
9 to←TargetBlock(best);
10 if (Block_empty(to))
11 Bo_PopulateBlock(to);
12 fi;
13 MoveInstr(best, from, to);
14 if (Block_empty(from))
15 Bo_EmptyBlock(from);
16 fi;
17 rdy←rdy-best;
18 rdy←rdy∪RdySuccs(best);
19 od;
20 PathCompress(CFG);

In line 1, an initial block ordering is made. An instruction ordering is made as part of the block ordering. Branch instructions are selected as part of the block order. Various currently known or new algorithms may be used to make this initial order.

Line 2 concerns critical edges and blocks, called JS blocks, that may be positioned on the critical edges if needed. (CFG stands for control flowgraph.) In some embodiments, it is desirable that the number of blocks and paths remains constant during scheduling. Accordingly, at least in these embodiments, the JS blocks are created before the scheduling begins. Referring to FIG. 4A, a critical edge exists between a split node, i.e., a node with multiple successors (e.g., block S), and a join node, i.e., a node with multiple predecessors (e.g., block J). The JS block is position on the critical edge, thereby replacing the edge with two non-critical edges, one between S and the JS block, and the other between the JS block and J. If later as part of scheduling, an instruction I is moved from block J to block B, a copy of instruction I can be moved to the JS block, as shown in FIG. 4B. A copy of instruction I in the JS block is referred to as compensation code. Accordingly, a JS block may be an empty block or a populated block depending on whether it actually holds any compensation code. In some embodiments, the JS blocks are placed in the physical order and in the control flowgraph. In other embodiments, the JS blocks are only placed in the control flowgraph. (In other embodiments, the JS block is not created until it is needed to hold compensation code.)

In line 3, empty blocks are removed from the initially constructed control flowgraph and affected branches are removed or changed. It may be that most of the empty blocks are JS blocks that were inserted in the statement of line 2. The code after removal of empty blocks is initial code as viewed by the instruction scheduler. The code may be the final position the blocks and branches would be in if there was no code motion (if no code was moved outside of its own block).

In line 4, a physical global code ordering is constructed for all blocks whether populated or empty to create table 30 (shown in FIG. 3). Various algorithms, including well know graph layout algorithms, may be used to create the ordering. Line 4 is similar to prior art activities except that there may be partially empty blocks in the remote region of the physical memory order. This ordering may be computed ignorant of the number of instructions in any block. This ordering provides the basis of the function append_block←LookupOrder(b), for any block b which needs to be reintroduced into the graph. This answers the question of where to place a newly populated block in the physical block order. The following provides additional information regarding block order table 30 and LookupOrder(b) in some embodiments. (In other embodiments, the details are different.) Table 30 includes a block order array, which is an array of pointers to blocks. The pointers in the array are in the same order as the blocks in the ideal physical block ordering computed by "ConstructBlockOrderingTable (CFG)". For example, if the physical block order computed by "ConstructBlockOrderingTable(CFG)" were A, B, C, and D, then the Block Order Array (BOA) would contain:

1. Pointer to A.
2. Pointer to B.
3. Pointer to C.
4. Pointer to D.

"ConstructBlockOrderingTable(CFG)" associates a physical order number (PON) with each block. That is, each block has a number N such that it is the Nth block in the physical order from the beginning. So initially block "C" has the number 3 in the above example. As an example, Block_Order_Array[PON(B)]→B.

When an emptied block is determined to be moved to the remote region of the physical block order, it's pointer is removed from the Block Order Array (BOA). That is, it's pointer is set to empty (Null). When a block is populated and moved to the current region, a pointer to itself is reinserted back into it's position in the BOA. For example, BOA[PON (B)]=Pointer to B. The net effect of this is that the BOA indicates which blocks are in the current region of the physical block order. This may be used to indicate which blocks it is believed will be path compressed away (although that may change) and where to reinsert blocks which are to be moved to the current region. For example, if block B were emptied and moved to the remote region, then BOA[2] would be set to empty (Null). Assume block C becomes emptied and moved to the remote region. It's entry BOA[3] would be set to empty (Null). Finally, assume block C is populated and is to be moved back to the current region. The BOA table is used to indicate after which block C should be appended. Since the BOA entry 2 immediately before C is empty, we look at the entry 1 before that to find that A is indeed in the true physical order. Block A becomes the block to append the newly populated block C.

The following is pseudo code for append_block←LookupOrder(b) in some embodiments:

```
index←PON(B);
do{
    index←index-1;
    mark←BOA[index];
}while (mark==Null);
return (mark);
```

Lines 5–20 provide a high level description of some embodiments of an instruction scheduler that interfaces with block ordering. Instruction scheduling is the assigning of an instruction to an execution unit for a particular cycle.

In line 5, DDG refers to the data dependency graph. As is well known, a data dependency graph lists dependencies of instructions. If an instruction has a dependency, it cannot be scheduled. DagRoots(DDG) provides those instructions that are not dependent on another instruction for that cycle. In some embodiments, the scheduler is top down scheduler. Rdy are those instructions that are ready to be scheduled.

Line 6 includes the start of a while do loop that extends from line 6 to line 19. The do loop continues while there are instructions to be scheduled. Note that "od" in line 19 is the end of the do loop. In lines 12 and 16, "fi" is the end of the "if" section beginning in lines 10 and 14, respectively.

In line 7, best is the best instruction ready to be scheduled. Various techniques, including well known techniques can be used to determine which is the best instruction. However, as described above, in addition to using general scheduling practices, the "BestCandidate( )" statement can look ahead as to what would be the global or regional cost of various possible instructions. The result could be feedback to the BestCandidate( ) function. One embodiment of this look-ahead feature is described in connection with FIG. 5. Referring to FIG. 5, as shown in box 50, the BestCandidate(rdy) function selects a possible best instruction (similar to line 7). As shown in box 52, the "from" and "to" blocks are selected (similar to lines 8 and 9). As shown in box 54, the instruction is moved and populate and empty functions are performed as need (similar to lines 10–15). As shown in box 56, the cost of the proposed move is assessed. (A negative cost is a benefit.) As shown in box 58, the states of the control flowgraph and physical memory order may be restored and the result of the assessment is fedback to the scheduler in BestCandidate(rdy). Note that the same or different code may be used to predict and assess cost, than is used to update block order. The same or different memory may be used for the two.

Figure 6B:
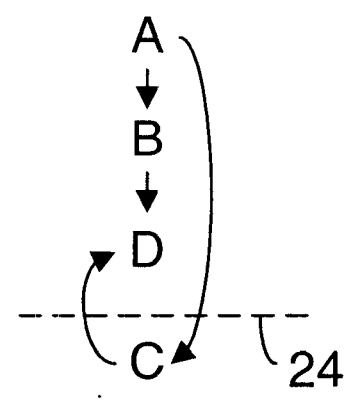
FIG. 6B is a representation of physical block order.

An example of how a change may have a benefit for one small area of code, but be globally harmful to performance, is provided as follows with reference to FIG. 6A (control flowgraph) and FIG. 6B (physical order). Assume blocks A, B, and D each have instructions. Block C is an empty JS block. Further assume path A B D is more likely than path A C D. Instruction "i" is considered for scheduling from block D into block B. In some situations, this motion may place block C between block B and D in the physical order. A side-effect of placing the block C into the current region of the physical order is adding an unconditional branch into block B (since it would no longer fall into D). Adding the unconditional branch into B may cost more overall runtime cycles than the savings from moving instruction i into B. Different heuristics may lead to placing C in different places. However, as described above, the cost of the different placements can be determined ahead of time and used in the decision of scheduling.

In line 8, a block called "from" is identified. In line 9, a block "to" is identified. Block "from" is the block the best instruction moves from and block "to" is the block it moves to. The "from" block may be called the source block and the "to" block may be called the target block.

In line 10, it is determined whether the block "to" was empty (including fully or partially empty) before the best instruction was move into it. In line 11, if the block was empty, then it is inserted into the block order using append_block←LookupOrder(b). In the case of partially empty blocks, for example, an unconditional branch may need to be removed. Populating may involve introducing other blocks into the control flowgraph, removing blocks from the control flowgraph, and updating conditional and unconditional branches and the testing of their readiness.

In line 13, the instruction "best" is moved from block "from" to block "to".

In line 14, it is determined whether the block "from" is empty after the instruction is moved out of it. In line 15, if it is now empty, it may be removed from the current region if need be. This may include removing other blocks from the control flowgraph, adding blocks to the control flowgraph, or updating conditional or unconditional branches and the testing of their readiness.

In line 17, the best instruction is removed from the set of ready instructions.

In line 18, each instruction that depended on the best instruction is now ready, as long as they are not dependent on something else.

In line 20, a form of transitive reduction called path compression is applied on the targets of conditional and unconditional branches that have empty blocks as their targets. This has the effect of removing any empty blocks that are not used after the instruction scheduling phase. This reduction has no effect on the modeling of branches or the ability to well schedule branches and so is performed after scheduling. Path compression is illustrated in examples below.

As an example, scheduling is included in lines 7–9 of the do loop. However, in contrast to the prior art, the control flowgraph and physical memory order may change (see lines 10–15) during scheduling. From one perspective, the scheduler uses the populate and empty functions as utilities. From another perspective, the populate and empty functions are part of the scheduler. Branches are added, removed, or inverted (switching target and fall through) as part of the populate and empty functions. The compiler of the present invention can take advantage of opportunities to improve code dynamically on the fly. The scheduler knows of the change to the physical order and related changes or elimination to branches and can take it into account in scheduling later instructions.

C. Examples

FIGS. 7A, 7B, and 7C illustrate an example of how branches can be changed during the scheduling process. Referring to FIG. 7A, a control flowgraph 60 includes blocks A, B, C, D, and E. The arrows represent edges between blocks. Assume that during the course of scheduling, blocks B and C have their instructions moved up out of their blocks so that blocks B and C are empty blocks. FIG. 7B shows control flowgraph 60 following the code motion of removing the instructions of blocks B and C. FIG. 7C includes columns 64, 66, and 68 that illustrate the physical block order at different stages of compilation. Column 64 shows the physical block order before blocks B and C are emptied. Column 66 shows the physical block order after blocks B and C are emptied, but before path compression. Column 68 shows the physical order after path compression.

As illustrated in column 66, when it is determined that block B has been emptied, block B is placed in the remote region of physical memory (see FIG. 2A). The unconditionally branch instruction from A to C is removed since C is on the fall through to E. B branches back to E. B is taken to the remote region so that the number of blocks and paths may remain constant during scheduling. By moving B to the remote region, the branch in A may be removed by path compression at the end of scheduling and there is one fewer branch in the scheduled code. In embodiments in which the number of blocks and paths does not have to remain constant during scheduling, B may disappear without going to the remote region. Another reason to place B in the remote region until path compression is that if it is determined that B should be re-populated, it may be easier to move it back to the current region of memory. The unconditional branch that was removed can be reinserted at the end of block A.

When C is emptied, it is not taken to the remote region because when C is removed, A falls through to E rather than falls through to C. There is no branch instruction in A to remove (other than the one to B which will be removed through path compression). An advantage of the some embodiments of the present invention is that the scheduler will know that the branch instruction will be removed. Therefore, depending on the circumstances, it may be able to schedule another instruction for the execution unit that would have received the branch instruction, or other instructions for execution units which would have been unavailable due to the branch being needed that same cycle. If it had been waited until the completion of scheduling to remove the branch instruction, the opportunity to schedule another instruction in its place may be lost.

Figure 8A:
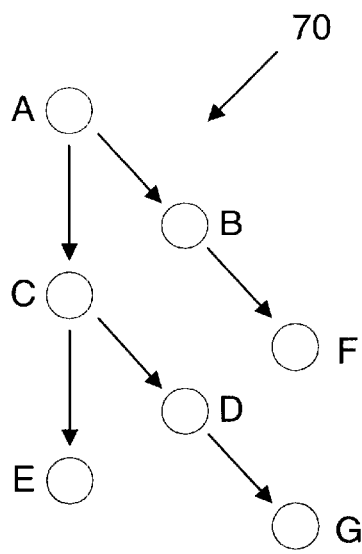
FIG. 8A is a control flowgraph.
Figure 8B:
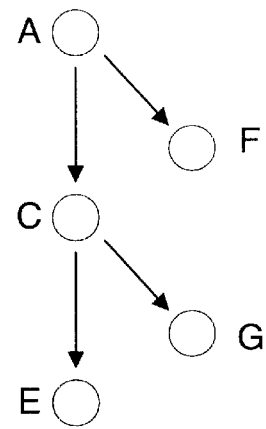
FIG. 8B is a control flowgraph.
Figure 8C:
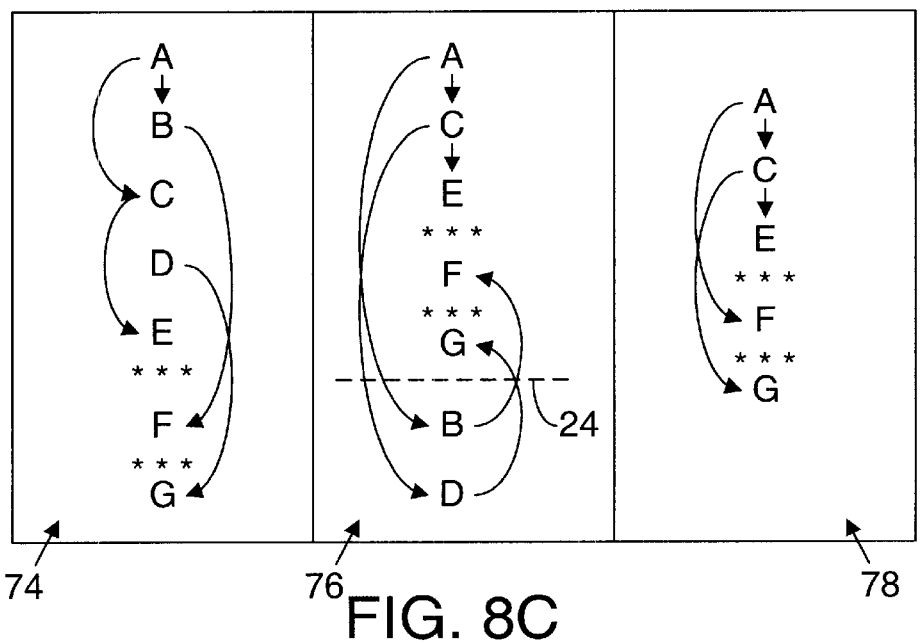
FIG. 8C is a representation of physical block order at different times.

FIGS. 8A–8C illustrate an example of updating the block order to expose a scheduling opportunity referred to as multi-way branches. In certain processors, multi-way branching occurs when multiple branches are concurrently executed in different execution units in the same cycle. In some processors, the branch instructions have to be in contiguous memory locations. Compilers have been used to try to place branch instructions next to each other in physical memory (when it otherwise is a good use of resources) to take advantage of multi-way branching capability. The inventors of the present invention do not claim to have invented multi-way branching or using a compiler to align branches in contiguous memory locations. However, the present invention can identify opportunities for multi-way branching that might be missed by prior art compilers.

For example, referring to FIG. 8A, a control flowgraph 70 includes blocks A, B, C, D, E, F, and G. (Note that in the examples of FIGS. 7A–7C and 8A–8C, there may be additional blocks that are not shown in the figures.) Assume that during the course of scheduling, blocks B and D have their instructions moved up out of their blocks. After this code motion, control flowgraph 70 would look like it does in FIG. 8B. FIG. 8C includes columns 74, 76, and 78. Column 74 represents the physical order of blocks A–G before code motion and corresponds to control flowgraph 70 in FIG. 8A. Blocks A–E are in physically contiguous memory locations. The "* * *" symbols in columns 74, 76, and 78 represent that blocks F and G are in memory locations that are not necessarily physically contiguous with block E. Blocks A and C each have conditional branches. Table 2, below, lists the target and fall through instructions of the conditional branches before code motion (see FIG. 8A and column 74 of FIG. 8C) and after code motion and block order updating (see FIG. 8B and column 78 of FIG. 8C).

TABLE 2

| | Target of conditional branch instruction of block A | Fall through of conditional branch instruction of block A | Target of conditional branch instruction of block C | Fall through of conditional branch instruction of block C |
|---|---|---|---|---|
| Before code motion (i.e., moving instructions out of blocks B and D) | first instruction of block C | first instruction of block B | first instruction of block E | first instruction of block D |
| After code motion and block order updating | first instruction of block F | first instruction of block C | first instruction of block G | first instruction of block E |

Column 78 illustrates an intermediate state of the physical order during the block order updating. Switching the target and fall through instruction of a conditional branch is referred to as inverting the conditional branch. In the example, the conditional branches are considered inverted because the target instruction prior to code motion becomes the fall through instruction, although the fall through instruction prior to code motion is removed from blocks B and D. With the physical order of column 78, the conditional branch instructions of blocks A and C may be used in a multi-way branch of a processor that supports multi-way branching. This type of opportunity cannot be exposed without updating the block order dynamically in response to code motion. A prior art compiler will not regularly find these opportunities created by code motion.

The question arises, why not invert the conditional branch of block A even if there is no code motion. The answer is that it is assumed that for other reasons, the physical order of column 74 is preferred. The edge A→B may be a higher probability edge so that block A would preferably fall into block B to save cycles. However, once block B becomes empty in the example, then the opportunity for improvement on the less probable path becomes exposed.

In summary, the updating exposes added or changed branches or other instructions to scheduling. Further, removed branches or other instructions can make room for other instructions to be scheduled.

D. Regeneration of Predicate Expressions to Invert Conditional Branches

Another advantage of the some embodiments of the invention is that the scheduler can know when to regenerate the inverse sense of a complex branch predicate expression for a branch that needs to be inverted before those expressions are scheduled. In some cases, the predicate qualifying the branch is defined by a very long complex sequence of compares. In prior art compilers, the inverse sense of the branch may be so complicated, that code generation may have to be redone. However, with the present invention in which scheduling and physical ordering are interactive, if it is noticed the branch needs to be inverted, the compares can be regenerated before they are scheduled. If—conversion may be used to regenerate predicate expressions.

Figure 9A:
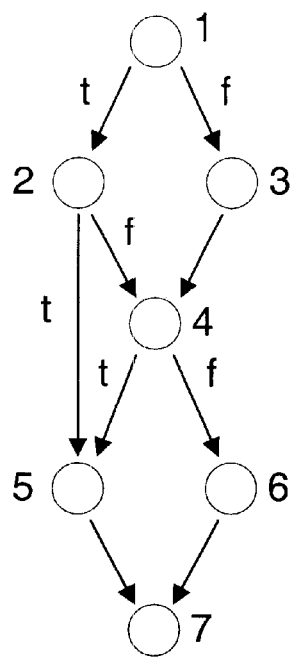
FIG. 9A is a control flowgraph.
Figure 9B:
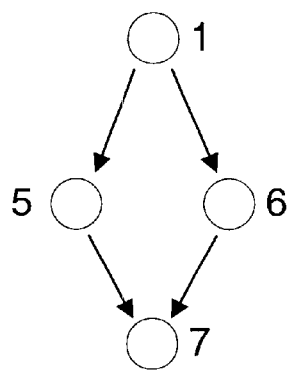
FIG. 9B is a control flowgraph.
Figure 9C:
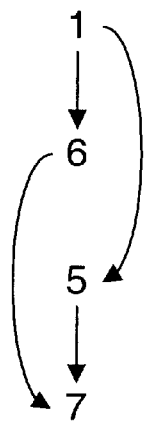
FIG. 9C is a representation of physical block order.

Consider an example in which predicate expressions are regenerated to invert a conditional branch. FIG. 9A illustrates a control flowgraph before an if-conversion. FIG. 9B illustrates a control flowgraph for predicate region (1, 2, 3, and 4) after the if-conversion. FIG. 9C illustrates a physical order after the if-conversion. To generate the compares for the conditional branch which ends block 1, the condition for block 5 or block 6 being true is computed. The condition used depends on whether the conditional branch at the end of block 1 is taken to reach block 5 or block 6. This decision is decided by LookupOrder( ) and may change during the course of scheduling since block 5 or 6 may become emptied or populated. Accordingly, when the conditional branch target changes, the conditional branch at the end of block 1 is inverted which may involve regenerating a different set of conditions for the branch to be taken. For the example, "p" stands for the block predicate (e.g., a Boolean value that is true if and only if control flows through the associated block) and "c" stands for the Boolean condition computed in the associated block. The associated block is indicated by the number following the letter "c" or "p".

p1=True p2=(c1=True)

p3=(c1=False)

p4=(c1=False.or.(p2=True.and.c2=False))

p5=(p2=True.and.c2=True).or.(p4=True .and. c4=True)

p6=(p4=True.and.c4=False)

From the Boolean algebra, computing the predicate for block 5 ("p5") to be executed has one more term than the expression for computing the conditions for block 6 ("p6"). Therefore, assuming each term of the expression takes one compare instruction to compute, inverting the conditional branch at the end of block 1 will involve regenerating different comparison conditions. The two predicate expressions have different resource requirements and so should be exposed to the instruction scheduler as early as possible to guarantee the best schedule. When one of the blocks is emptied and it is known the conditional branch should be inverted, the comparison expression instructions can be regenerated and there is still a chance to schedule them in one top-down pass. (In other embodiments, details of regeneration of predicate expressions may be different.)

E. Additional Information and Embodiments

The present invention may be used over an arbitrary number of blocks (including the entire program).

If the specification states a component, feature, structure, or characteristic "may", "might", or "could" be included, that particular component, feature, structure, or characteristic is not required to be included.

In FIGS. 2A and 2B, in multithreaded version of the compiler, there might or might not be more than one physical order in parallel, depending on the implementation.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method of compiling instructions of a program, comprising:
   receiving instructions for code motion; and
   controlling the code motion while interacting with block ordering, wherein the controlling includes:
   (a) establishing a physical order before the code motion, wherein the blocks include populated blocks;
   (b) performing code motion for one of the instructions;
   (c) if the step of code motion in (b) causes (1) a partially empty block to become populated, (2) the creation and population of a new block, or (3) a populated block to be emptied or made partially empty, then the physical ordering of blocks is updated, and
   (d) repeating (b) and (c) until the code motion for the instructions is completed.

2. The method of claim 1, wherein path compression is performed between (c) and (d) to leave only populated blocks.

3. The method of claim 1, wherein controlling the code motion while interacting with block ordering includes detecting multiple branches for multi-way branching.

4. The method of claim 1, wherein the code motion is done as part of instruction scheduling and the scheduling selectively involves regeneration of predicate expressions to invert conditional branches.

5. The method of claim 1, wherein for some of the instructions the code motion involves scheduling the instruction and for others of the instructions, the code motion involves moving the instruction out of a loop.

6. The method of claim 1, wherein the code motion is done as part of instruction scheduling and the scheduling involves making an assessment of the cost of scheduling an instruction and determining whether to make the code motion based on the cost.

7. The method of claim 1, wherein the code motion is done as part of partial redundancy elimination.

8. An article comprising:
   a computer readable medium having instructions thereon which when executed cause a computer to perform the following method:
   receiving instructions for code motion; and
   controlling the code motion while interacting with block ordering, wherein the controlling includes:
   (a) establishing a physical order before the code motion, wherein the blocks include populated blocks;
   (b) performing code motion for one of the instructions;
   (c) if the step of code motion in (b) causes (1) a partially empty block to become populated, (2) the creation and population of a new block, or (3) a populated block to be emptied or made partially empty, then the physical ordering of blocks is updated, and
   (d) repeating (b) and (c) until the code motion for the instructions is completed.

9. The article of claim 8, wherein path compression is performed between (c) and (d) to leave only populated blocks.

10. The article of claim 8, wherein controlling the code motion while interacting with block ordering includes detecting multiple branches for multi-way branching.

11. The article of claim 8, wherein the code motion is done as part of instruction scheduling and the scheduling selectively involves regeneration of predicate expressions to invert conditional branches.

12. The article of claim 8, wherein for some of the instructions the code motion involves scheduling the instruction and for others of the instructions, the code motion involves moving the instruction out of a loop.

13. The article of claim 8, wherein the code motion is done as part of instruction scheduling and the scheduling involves making an assessment of the cost of scheduling an instruction and determining whether to make the code motion based on the cost.

14. The article of claim 8, wherein the code motion is done as part of partial redundancy elimination.

15. A system comprising:
 a computer including memory, wherein the memory that includes instructions that when executed cause the computer to perform the following method:
 receiving instructions for code motion; and
 controlling the code motion while interacting with block ordering, wherein the controlling includes:
 (a) establishing a physical order before the code motion, wherein the blocks include populated blocks;
 (b) performing code motion for one of the instructions;
 (c) if the step of code motion in (b) causes (1) a partially empty block to become populated, (2) the creation and population of a new block, or (3) a populated block to be emptied or made partially empty, then the physical ordering of blocks is updated, and
 (d) repeating (b) and (c) until the code motion for the instructions is completed.

16. The system of claim 15, wherein path compression is performed between (c) and (d) to leave only populated blocks.

17. The system of claim 15, wherein controlling the code motion while interacting with block ordering includes detecting multiple branches for multi-way branching.

18. The system of claim 15, wherein the code motion is done as part of instruction scheduling and the scheduling selectively involves regeneration of predicate expressions to invert conditional branches.

19. An article comprising:
 a machine readable medium having a program thereon which is created by a compiler that performs the following method:
 receiving instructions for code motion; and
 controlling the code motion while interacting with block ordering, wherein the controlling includes:
 (a) establishing a physical order before the code motion, wherein the blocks include populated blocks;
 (b) performing code motion for one of the instructions;
 (c) if the step of code motion in (b) causes (1) a partially empty block to become populated, (2) the creation and population of a new block, or (3) a populated block to be emptied or made partially empty, then the physical ordering of blocks is updated, and
 (d) repeating (b) and (c) until the code motion for the instructions is completed.

20. The article of claim 19, wherein path compression is performed between (c) and (d) to leave only populated blocks.

21. The article of claim 19, wherein controlling the code motion while interacting with block ordering includes detecting multiple branches for multi-way branching.

22. The article of claim 19, wherein the code motion is done as part of instruction scheduling and the scheduling selectively involves regeneration of predicate expressions to invert conditional branches.

23. The article of claim 19, wherein for some of the instructions the code motion involves scheduling the instruction and for others of the instructions, the code motion involves moving the instruction out of a loop.

\* \* \* \* \*